United States Patent
Schwartz et al.

(10) Patent No.: US 6,762,208 B2
(45) Date of Patent: Jul. 13, 2004

(54) ALKANE DIOL FOAM CONTROLLING AGENTS

(75) Inventors: Joel Schwartz, Lansdale, PA (US); Charles James Reader, De Meern (NL); Wim Peter Stout, Zwolle (NL); Yong Jin Lee, Palisades Park, NJ (US); Christine Marie Kretz, Emmaus, PA (US)

(73) Assignee: Air Products and Chemicals, Inc., Allentown, PA (US)

( * ) Notice: Subject to any disclaimer, the term of this patent is extended or adjusted under 35 U.S.C. 154(b) by 10 days.

(21) Appl. No.: 09/968,204

(22) Filed: Oct. 1, 2001

(65) Prior Publication Data

US 2003/0144365 A1 Jul. 31, 2003

(51) Int. Cl.$^7$ .............................................. B01D 19/04
(52) U.S. Cl. ........................ 516/132; 516/204; 106/18; 106/31.18; 106/31.86; 208/205; 504/358; 508/459; 508/506; 508/561; 510/245; 510/505; 510/535; 430/331
(58) Field of Search ................................. 516/132, 204; 106/18, 31.18, 31.86, 31.89; 208/205; 430/331; 504/358; 508/459, 506, 561; 510/245, 505, 535

(56) References Cited

U.S. PATENT DOCUMENTS

| | | | |
|---|---|---|---|
| 2,992,278 A | 7/1961 | Tedeschi ...................... | 260/617 |
| 3,095,381 A | 6/1963 | Tinnon ........................ | 252/161 |
| 3,330,871 A | 7/1967 | Magel et al. ................ | 260/610 |
| 4,287,080 A | 9/1981 | Siklosi ........................ | 252/104 |
| 4,689,168 A | 8/1987 | Requejo ...................... | 252/139 |
| 5,746,813 A | 5/1998 | Malhorta et al. ............. | 106/18 |
| 5,808,110 A | 9/1998 | Torenbeek et al. .......... | 349/352 |

FOREIGN PATENT DOCUMENTS

| | | |
|---|---|---|
| EP | 0 402 812 | 12/1990 |
| EP | 1 115 035 A1 | 7/2001 |
| GB | 843379 | 8/1996 |
| JP | 08-291001 | 11/1996 |
| WO | WO 93/ 183431 | 9/1993 |

OTHER PUBLICATIONS

File REG on STN, CAS ONLINE, Columbus, OH, CN citation for "SURFYNOL 420", "SURFYNOL 485", SUR‐FYNOL 104H an "SURFYNOL 104S", (Jan. 2004).*
Machine Translation of JP 08–291001, Japan Patent Office, http://www19.ipdl.jpo.go.jp/PA1/cgi–bin/PA1NUMBER (Nov. 0003).
Michael and Irene Ash, Handbook of Industrial Surfactants, (Gower Publishing Co, Brookfield, VT 1993–month unknown, page 512.
Tedeschi, Robert J., "Hydrogenation–Hydrogenolysis Studies of Symmetrically Substituted 1,4–Acetylenic Glycols", J. Org. Chem, 1962, 27, 2398 (Jul., 1962).
Mysels, Karol J., "Improvements in the Maximum–Bubble Pressure Method of Measuring Surface Tension", American Chemical Society, 1986, pp 428–432, month unknown.
Ullmann's Encyclopedia of Industrial Chemistry, Fifth edition, Volume A II:Fibers, 5, Synthetic Inorganic to Formaldehyde, pp 465–491, (1988, month unknown).
M. W. Leeds, et al., "Acetylenic Nonionic Surfactants," *I & EC Product Research and Development,* vol. 4, No. 4, pp. 236–242 (1965), month unknown.
European Search Report No. 02021478.9–2104, dated Dec. 18,200.

* cited by examiner

Primary Examiner—Daniel S. Metzmaier
(74) Attorney, Agent, or Firm—Michael Leach

(57) ABSTRACT

The present invention pertains to a method for controlling the foaming of a waterborne composition or an industrial process by the incorporation of a foam controlling agent. The method comprises utilizing as the foam controlling agent a compound of the formula:

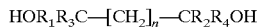

$$HOR_1R_3C\text{—}[CH_2]_n\text{—}CR_2R_4OH$$

$R_1$ and $R_2$ are independently selected from the group of alkyl radicals having from 3 to 6 carbon atoms. $R_3$ and $R_4$ are independently alkyl radicals having from 1 to 2 carbon atoms. n is an integer from 1 to 6. The compound generates an initial (t=0 min.) or a final (t=10 min.) foamed density at least 30% greater than that of a 0.5 wt % aqueous solution of a 12 mole ethoxylate of a $C_{12}$–$C_{15}$ primary alcohol ($C_{12}$–$C_{15}E_{12}$) when added at 0.2 wt % to the $C_{12}$–$C_{15}E_{12}$ solution. The present invention also pertains to an aqueous composition comprising the foam controlling agent.

35 Claims, No Drawings

ALKANE DIOL FOAM CONTROLLING AGENTS

FIELD OF THE INVENTION

The invention relates to the use of the alkane diols as foam controlling agents.

BACKGROUND OF THE INVENTION

Foam control or elimination in many waterborne applications and industrial processes is critical for obtaining optimal performance in application and high process efficiency. The importance of foam control and elimination in applications such as waterborne coatings, inks, adhesives, and agricultural formulations and in industrial processes such as oil well pumping, petroleum gas scrubbing, cleansing and disinfecting, food processing, pulp and paper processing, fermentation, metal treatment, polymer and chemical synthesis, waste-water treatment and textile dying and finishing is well-appreciated in the art.

Foam controlling agents are widely used in polymer production and processing, as foam can lead to reduced production capacity, efficiency and equipment problems. In particular, severe foaming problems commonly result upon stripping unreacted monomers from the polymer product.

Undesirable foam can lead to inefficient mixing, poor productivity, reduced vessel capacity and equipment failure in many common industrial processes. For instance, foaming in refinery processes such as drilling, production, stimulation, distillation, extraction, gas and liquid scrubbing and other operations leads to a number of operating difficulties and significant economic consequences. In acid gas sweetening, gases such as carbon dioxide and hydrogen sulfide are removed via scrubbing with an aqueous amine solution. Problematic foam can occur during both the scrubbing or regeneration steps in this process.

For applications such as coatings, the dynamic nature of spraying, rolling, or brushing the coating onto a substrate will introduce air into the system which can manifest itself as foam. This foam can cause coating failure due to factors such as low gloss or poor surface coverage. In cleaning applications, a small amount of controlled foam may be needed during cleaning, but too much foam can affect the perceived time to clean and rinse the soiled article. Defoamers and antifoams are additives that are used to reduce or eliminate problematic foam. The term "antifoam" refers to a long-acting additive that prevents foam formation. The term "defoamer" refers to an additive that eliminates, or at least reduces, existing foam. The term "foam controlling agent", as used herein, refers to an additive that prevents and/or eliminates/reduces foam since many applications and processes require both foam prevention and foam elimination.

In many applications, it is desirable for foam controlling agents should impart positive ancillary surface properties, such as wetting, dispersion, emulsification, solubilization, flow and leveling, adhesion, and gloss. For example, defoamers and antifoams that act as wetting agents will greatly reduce surface defects in coatings, inks, adhesives and agricultural formulations. In addition, such multi-functional materials will allow for the reduction or elimination of wetting agents in a waterborne composition, thereby reducing the total amount of additives. The ability of a material to act as a wetting agent in waterborne formulations is determined by its ability to reduce the surface tension of water. Equilibrium surface tension performance is important when a system is at rest. However, the ability to reduce surface tension under dynamic conditions is of great importance in applications where high surface creation rates are utilized. Such applications include the spraying, rolling and brushing of coatings, adhesives or agricultural formulations, or high-speed gravure or ink-jet printing. Dynamic surface tension is a fundamental quantity which provides a measure of the ability of a substance to reduce surface tension and provide wetting under high-speed application conditions. Also, it is under such high speed application conditions where the entrainment of air and the creation of foam is a problem.

In order to achieve wetting, additives such as dioctyl sodium sulfosuccinate (DOSS) are often employed. An adverse effect that often accompanies its use is a large amount of foam, which may cause a need for the use of a second additive as a defoamer to control that foam. Thus, the ability of a single agent to impart superior foam control and to strongly influence other performance attributes such as wetting, flow and leveling, corrosion inhibition, emulsification, adhesion, gloss, and/or dispersion is highly valued in application areas such as coatings, inks, adhesives, cleaning, semiconductor, dye, or pigment manufacture, metalworking and finishing, agricultural formulations, pulp and paper, oil and gas applications, chemical, emulsion, and pharmaceutical manufacturing, food and beverage processing, wastewater treatment, and textile manufacturing and processing.

Alkane diols such as ethylene or propylene glycol are most commonly known as solvents in areas such as coatings, inks, and adhesives formulations. Although their addition to formulations is sometimes for the purpose of reducing solid levels, providing freeze-thaw benefits, or (at higher use levels) to enhance wetting, they have not been reported as multi-functional foam controlling agents.

U.S. Pat. No. 2,992,278 describes a process for the production of 1,4-saturated diols. *J. Org. Chem.*, 1962, 27, 2398 further elaborates on the hydrogenation and hydrogenolysis of symmetrically substituted 1,4-acetylenic glycols. Neither discusses the performance of these products.

2,4,7,9-tetramethyldecane-4,7-diol (HTMDD) has been reported in *I&EC Product Research and Development*, 1965, 4, 236 as a wetting agent, albeit one with inferior wetting properties relative to its acetylenic analogue, 2,4,7,9-tetramethyldecyne-4,7-diol (TMDD). Although foam control data is reported for various ethoxylated derivatives of HTMDD, no foam control information is reported for HTMDD itself.

GB 843,379 describes acetylenic diols and alkane diols as compatible solubilizers, which when used in conjunction with sulfonate surfactants, impart foam stability to a shampoo composition. Specifically disclosed are shampoo compositions containing 3,6-dimethyl-4-octyne-3,6-diol (DMOD or Surfynol® 82), 2,5-dimethyl-3-hexyne-2,5-diol (DMHD or DH), or 3,6-dimethyloctane-3,6-diol (HDMOD) in amounts from 6–50% by weight, with 8–20% by weight of a surfactant, and from 6–50% by weight of an alkylolamide of a fatty acid. These formulations are said to impart a large volume of foam of good stability. Since this combination of products is said to be effective in these performance attributes because of the combination of components contained within the formulation, the alkane diol, HDMOD, is actually adding to the foam, not controlling or reducing it.

U.S. Pat. No. 4,287,080 describes improved detergent compositions. An integral part of these compositions is a component which, in its broadest description, is 0.5–50% of a tertiary alcohol having at least 5 carbon atoms and less than 100 carbon atoms per molecule. Numerous tertiary alcohols are described with no mention of any performance differences among such examples as 1-methylcyclohexanol, 2-methyl-2-propanol, and 2,5-dimethyl-2,5-hexanediol (HDMHD).

U.S. Pat. No. 4,692,277 discloses $C_8$–$C_{12}$ diols that are included as components in a hard surface liquid cleaner with no mention of their foaming performance.

U.S. Pat. No. 5,808,110, U.S. Pat. No. 3,330,871, and WO Pat. 93/18431 discuss the use of alkane diols as safety solvents or as additives for liquid crystals. None of these disclosures mention their use as foam controlling agents or as wetting or flow and leveling agents for coating, ink, and adhesive applications.

SUMMARY OF THE INVENTION

The present invention pertains to a method for controlling the foaming of a waterborne composition or an industrial process by the incorporation of a foam controlling agent. The method comprises utilizing as the foam controlling agent a compound of the formula:

$$HOR_1R_3C-[CH_2]_n-CR_2R_4OH$$

$R_1$ and $R_2$ are independently selected from the group of alkyl radicals having from 3 to 6 carbon atoms. $R_3$ and $R_4$ are independently alkyl radicals having from 1 to 2 carbon atoms. n is an integer from 1 to 6. The compound generates an initial (t=0 min.) or a final (t=10 min.) foamed density at least 30% greater than that of a 0.5 wt % aqueous solution of a 12 mole ethoxylate of a $C_{12}$–$C_{15}$ primary alcohol ($C_{12}$–$C_{15}E_{12}$) when added at 0.2 wt % to the $C_{12}$–$C_{15}E_{12}$ solution.

The present invention also pertains to an aqueous composition comprising a foam controlling agent, which composition manifests greater foaming in the absence of the foam controlling agent. The foam controlling agent is an alkane diol present in a foam controlling amount and having the formula:

$$HOR_1R_3C-[CH_2]_n-CR_2R_4OH$$

$R_1$ and $R_2$ are independently selected from the group of alkyl radicals having from 3 to 6 carbon atoms. $R_3$ and R4 are independently alkyl radicals having from 1 to 2 carbon atoms. n is an integer from 1 to 6. The compound generates an initial (t=0 min.) or a final (t=10 min.) foamed density at least 30% greater than that of a 0.5 wt % aqueous solution of a 12 mole ethoxylate of a $C_{12}$–$C_{15}$ primary alcohol ($C_{12}$–$C_{15}E_{12}$) when added at 0.2 wt % to the $C_{12}$–$C_{15}E_{12}$ solution.

DETAILED DESCRIPTION OF THE INVENTION

This invention relates to the use of alkane diols as foam controlling agents. In many cases, these alkane diols provide other performance benefits such as enhanced wetting, gloss, adhesion, and/or leveling. The excellent defoaming and antifoaming properties of these foam controlling agents suggest that these materials are likely to find applicability in applications and processes in which the reduction, prevention or knock-down of foam are important. Such applications include protective and decorative coatings, inks, adhesives, agricultural formulations, oil well pumping, petroleum gas scrubbing, cleansing and disinfecting, food processing, pulp and paper processing, fermentation, metal treatment, polymer and chemical synthesis, waste-water treatment, and textile dyeing and finishing. In addition, these materials have the ability to also reduce the dynamic surface tension of waterborne compositions. Such a combination of performance attributes allow these materials to be used to control and eliminate foam with significantly less deleterious effects in application, making them extremely useful in coatings, inks and adhesives. Moreover, the wetting ability of these foam controlling agents will allow these materials to be utilized in polymer production and processing without the appearance of negative defects in downstream applications.

The ability of an additive to reduce foam is of great importance to the performance of water-based coatings, inks, fountain solutions, adhesives, metalworking fluids, agricultural formulations, and electronic chemicals. Lower foam in a system means that higher throughputs are possible in manufacturing and better performance of the formulation or product as it is used. Foam control agents that offer more than just one performance benefit are highly regarded and often considered of great economic benefit. Additionally, having such a product as a liquid which does not contribute a significant amount of volatile organic compounds (VOCs) to the total formulation is of benefit. The alkane diols described herein fulfill these performance benefits.

The alkane diols of this invention expand the range of multifunctional foam control agents to those which not only have defoaming and antifoaming performance, but which impart a unique combination of enhanced wetting, leveling, and gloss, low defects and other positive aesthetic properties. Additionally, the use of these surfactants is possible in a multitude of waterborne compositions including coatings, inks, adhesives, fountain solutions, agricultural formulations, metalworking fluids, and electronic chemicals.

The term "water-based", "waterborne", "aqueous", or "aqueous medium", as used herein, means a solvent or liquid dispersing medium which comprises water, preferably at least 90 wt %, and most preferably at least 95 wt %, water. Obviously, an all water medium is also included.

In another embodiment of the invention, the foam controlling agents may be used as wetting agents to improve upon, among other attributes, the minimization of defects, leveling performance, gloss, and stain resistance.

There are significant advantages associated with the use of these alkane diols as multifunctional foam controlling agents in waterborne compositions such as coatings, inks, adhesives, fountain solutions, agricultural formulations, electronic chemicals formulations, and cleaning formulations, as well as processing aids for areas such as metalworking and finishing, oil and gas processing, pulp and paper processing, wastewater treatment, and dye, pigment, textile, emulsion, chemical, and pharmaceutical manufacturing. These benefits include, but are not limited to: foam controlling agents which have low odor and color; foam controlling agents which comprise 100% active ingredients, thus not requiring carrier solvents, fluids or other additives; foam controlling agents capable of reducing the dynamic surface tension of waterborne coatings, inks, adhesives, agricultural, and cleaning formulations such that even contaminated surfaces are highly wetted; the reduction of coating or printing defects which are normally associated with conventional foam controlling agents; an improvement in the wetting performance of a waterborne system or process operated at high speeds; waterborne coatings, inks, and adhesives which have low volatile organic content, rendering the formulation environmentally favorable.

As set out above, the present invention provides a method for controlling the foaming of a waterborne composition or an industrial process by the incorporation of a foam controlling agent. The method comprises utilizing as the foam controlling agent a compound of the formula:

$HOR_1R_3C-[CH_2]_n-CR_2R_4OH$ $R_1$ and $R_2$ are independently selected from the group of alkyl radicals having from 3 to 6 carbon atoms, preferably from 4 to 6 carbon atoms, and more preferably from 4 to 5 carbon atoms.

$R_3$ and $R_4$ are independently alkyl radicals having from 1 to 2 carbon atoms, preferably $R_3$ and $R_4$ are methyl radicals.

n is an integer ranging from 1 to 6, preferably from 1 to 4, more preferably from 1 to 3, and most preferably 2.

In a preferred embodiment, $R_1$ and $R_2$ are independently selected from the group of alkyl radicals having from 4 to 6 carbon atoms, $R_3$ and $R_4$ are methyl, and n is 2. In another preferred embodiment, the compound is 2,4,7,9-tetramethyldecane-4,7-diol. In yet another preferred embodiment, the compound is 2,5,8,11-tetramethyldodecane-5,8-diol.

The foam controlling agent generates an initial (t=0 min.) or a final (t=10 min.) foamed density at least 30% greater than that of a 0.5 wt % aqueous solution of a 12 mole ethoxylate of a $C_{12}$–$C_{15}$ primary alcohol ($C_{12}$–$C_{15}E_{12}$) when added at 0.2 wt % to the $C_{12}$–$C_{15}E_{12}$ solution. Preferably, the compound generates an initial or a final foamed density at least 40% greater than that of a 0.5 wt % aqueous solution of a 12 mole ethoxylate of a $C_{12}$–$C_{15}$ primary alcohol ($C_{12}$–$C_{15}E_{12}$) when added at 0.2 wt % to the $C_{12}$–$C_{15}E_{12}$ solution, and most preferably at least 50% greater. Preferably, the foam controlling agent generates an initial (t=0 min.) and a final (t=10 min.) foamed density at least 30% greater than that of a 0.5 wt % aqueous solution of a 12 mole ethoxylate of a $C_{12}$–$C_{15}$ primary alcohol ($C_{12}$–$C_{15}E_{12}$) when added at 0.2 wt % to the $C_{12}$–$C_{15}E_{12}$ solution. Preferably, the compound generates an initial and a final foamed density at least 40% greater than that of a 0.5 wt % aqueous solution of a 12 mole ethoxylate of a $C_{12}$–$C_{15}$ primary alcohol ($C_{12}$–$C_{15}E_{12}$) when added at 0.2 wt % to the $C_{12}$–$C_{15}E_{12}$ solution, and most preferably at least 50% greater. The primary alcohol ethoxylate (PAE) test employed here, also known as the Blender Foam Test, is described in Am. Soc. For Testing Materials, Method D3519-88, Philadelphia, Pa., 1953, which disclosure is incorporated herein by reference. The primary alcohol ethoxylate employed in this test is Neodol™ 25–12, a 12 mole ethoxylate of a $C_{12}$–$C_{15}$ primary alcohol ($C_{12}$–$C_{15}E_{12}$).

The alkane diols are suitable for use in an aqueous composition comprising in water an inorganic compound which is a mineral ore or a pigment or an organic compound which is a pigment, a polymerizable monomer, an emulsion which is an aqueous suspension of the addition or condensation polymers of a vinyl monomer, an oligomeric resin, a polymeric resin, a detergent, a caustic cleaning agent, an herbicide, a fungicide, an insecticide, or a plant growth modifying agent.

Foam control may be measured through various test methods, all of which involve agitation or movement of a liquid so as to entrain air into the system, with the subsequent breaking of that entrained air which usually manifests itself on the surface or in the liquid as foam. A measure of the antifoaming ability of an agent is recorded as the initial foamed height, volume, or density of the system. The defoaming ability of an agent is shown by the time required to break the foam either partially or completely. Although a standard test for measuring the foam performance of a defoamer by itself (Example 6) is the Ross-Miles foam test (Am. Soc. For Testing Materials, Method D1173-53, Philadelphia, Pa., 1953), variations of the Blender Foam Test described in Am. Soc. For Testing Materials, Method D3519-88, Philadelphia, Pa., 1953, are more commonly used in systems with more than one component, as described in Examples 1–5 and 7, and is incorporated herein for reference. Since the application areas referred to in examples 1–5 and 7 have different foam control needs, the method of agitation in our studies are varied (Red Devil Shaker for example 2, Dispermat for examples 3 and 4, and Waring Blender for examples 1–5 and 7), but the comparisons for examples 1–5 and 7 are all made in terms of the weight of the sample divided by the volume of the foam and liquid, hereafter referred to as the "foamed density". Although the Blender Foam Test method calls for a final measurement at 5 minutes, we have measured the foamed density at time intervals which are significant for each application area. The significance of foam control may vary from one application area to another, but an important component of this invention is that regardless of the type of agitation, the alkane diol agents of interest are effective foam controlling agents in multicomponent systems.

Another benefit that a multifunctional foam controlling agent may have begins with, but is not limited to, wetting. The Maximum Bubble Pressure method of measuring dynamic surface tension is described in Langmuir, 1986, 2, 428–432 and is incorporated herein for reference. The surface tension reduction necessary for a given system is highly dependent upon the surfaces which need to be covered or wetted in that application.

The amount of alkane diol that is effective to reduce or eliminate the foam of a water-based, organic compound containing composition may range from 0.001 to 20 wt %, preferably from 0.001 to 10 wt %, and most preferably from 0.001 to 5 wt %, based on total weight of the formulation. The most favorable amount will vary from one application to another, depending upon the foam contributing species in that system.

A typical water-based decorative or protective coating formulation to which foam controlling agents of the invention may be added would comprise the following components in an aqueous medium at 30–80% solids:

| Typical Water-Based Coating Formulation | |
|---|---|
| 0 to 50 wt % | Pigment Dispersant/Grind Resin |
| 0 to 80 wt % | Coloring Pigments/Extender Pigments/Anti-Corrosive Pigments/Other Pigment Types |
| 5 to 99 wt % | Waterborne, Water-Dispersible, or Water Soluble Resins |
| 0 to 30 wt % | Slip Additives/Antimicrobials/Processing Aids |
| 0 to 50 wt % | Coalescing or other Solvents |
| 0.01 to 10 wt % | Surfactant/Wetting Agent/Flow and Leveling Agents |
| 0.001 to 5 wt % | Alkane diol foam controlling agent |

A typical water-based ink composition to which the foam controlling agent of the invention may be added would comprise the following components in an aqueous medium at 20 to 60% solids:

| Typical Water-Based Ink Composition | |
| --- | --- |
| 1 to 50 wt % | Pigment |
| 0 to 50 wt % | Pigment Dispersant/Grind Resin |
| 0 to 50 wt % | Clay base in appropriate resin solution vehicle |
| 5 to 99 wt % | Waterborne, Water-Dispersible, or Water-soluble Resins |
| 0 to 30 wt % | Coalescing Solvents |
| 0.01 to 10 wt % | Surfactant/Wetting Agent |
| 0.01 to 10 wt % | Processing Aids/Solubilizing Agents |
| 0.001 to 5 wt % | Alkane diol foam controlling agent |

A typical water-based agricultural composition to which the foam controlling agent of the invention may be added would comprise the following components in an aqueous medium at 0.2 to 80% solids:

| Typical Water-Based Agricultural Composition | |
| --- | --- |
| 0.1 to 50 wt % | Pesticide or Plant Growth Modifying Agent |
| 0.01 to 10 wt % | Surfactant |
| 0 to 5 wt % | Dyes |
| 0 to 20 wt % | Thickeners/Stabilizers/Co-Surfactants/Gel Inhibitors |
| 0 to 25 wt % | Antifreeze |
| 0.01 to 50 wt % | Wetting Agent |
| 0.001 to 5 wt % | Alkane diol foam controlling agent |

A typical fountain solution composition for planographic printing to which the foam controlling agent of the invention may be added would comprise the following components:

| Typical Fountain Solution for Planographic Printing | |
| --- | --- |
| 0.05 to 10 wt % | Film Formable, Water-Soluble Macromolecule |
| 1 to 25 wt % | Alcohol, Glycol, or Polyol with 2–12 Carbon Atoms |
| 0.01 to 20 wt % | Water-Soluble Organic Acid, Inorganic Acid, or a Salt thereof |
| 30 to 70 wt % | Water |
| 0.01 to 5 wt % | Wetting Agent |
| 0.001 to 5 wt % | Alkane diol foam controlling agent |

A typical metalworking fluid to which the foam controlling agent of the invention may be added would comprise the following components:

| Typical Synthetic Metalworking Fluid Formulation | |
| --- | --- |
| 2.5 to 10 wt % | Block copolymer |
| 10 to 25 wt % | Alkanolamine |
| 2 to 10 wt % | Organic monoacid |
| 0 to 5 wt % | Organic diacid |
| 50 to 60 wt % | Water |
| 1 to 5 wt % | Biocide |
| 0.001 to 5 wt % | Alkane diol foam controlling agent |

A typical hard surface cleaner to which the foam controlling agent of the invention may be added would comprise the following components:

| Typical Hard Surface Cleaner Formulation | |
| --- | --- |
| 1 to 10 wt % | Anionic surfactant |
| 1 to 10 wt % | Nonionic surfactant |
| 0.1 to 3 wt % | Carboxylate salt |
| 1 to 10 wt % | Glycol ether |
| 0.5 to 3 wt % | Buffering agents |
| 60 to 95 wt % | Water |
| 0.001 to 5 wt % | Alkane diol foam controlling agent |

A typical water-based photoresist developer or electronic cleaning composition to which the foam controlling agent of the invention may be added would comprise the following components:

| Typical Water-Based Photoresist Developer Composition | |
| --- | --- |
| 0.1 to 3 wt % | Tetramethylammonium Hydroxide |
| 0 to 4 wt % | Phenolic Resin |
| 88 to 99.99 wt % | Water |
| 10–50000 ppm | Alkane diol foam controlling agent |

A typical pressure overprint varnish to which the foam controlling agent of the invention may be added would comprise the following components:

| Typical Overprint Varnish | |
| --- | --- |
| 20 to 80 wt % | Waterborne or water-Dispersible Resin |
| 0 to 20 wt % | Wax |
| 2 to 50 wt % | Water |
| 0 to 20 wt % | Biocides/Optical Brighteners/Crosslinkers/Scuff and Water-Resistance Additives |
| 0 to 20 wt % | Co-Solvents |
| 0.01 to 5 wt % | Wetting Agent |
| 0.001 to 5 wt % | Alkane diol foam controlling agent |

EXAMPLES

All alkane diols were synthesized via a slight modification of the procedure described in U.S. Pat. No. 2,992,278, incorporated herein by reference. These products were characterized by gas chromatography/mass spectrometry, and Nuclear Magnetic Resonance (NMR) spectroscopy. All alkane diols prepared were >95% pure. Example 6 demonstrates the foam performance of HTMDD (2,4,7,9-tetramethyldecane-4,7-diol) and HTMDDD (2,5,8,11-tetramethyldodecane-5,8-diol) in water, particularly relative to their acetylenic analogues, Surfynol® 104 (S104, 2,4,7,9-tetramethyldecyne-4,7-diol, TMDD) and TMDDD (2,5,8,11-tetramethyldodecyne-5,8-diol) surfactants, respectively. Example 1 describes a standard test used to evaluate multifunctional foam controlling agents. Examples 2–5 demonstrate the improved foam control and other benefits such as appearance, leveling, and wetting relative to a blank control and other additives used in model coatings and graphic arts formulations. Unless otherwise stated, in examples 1–5, if scales are used, the higher the number, the better the performance. Example 7 is a comparison example that demonstrates the poor foam performance of compounds described in the prior art.

Example 1

Performance Benefits with Wetting Agents and Emulsifiers

In order to understand the broad applicability of a defoamer in a wide range of systems, it is helpful to understand how a defoamer would react with the foamiest element of that system. To this end, we examined the foam behavior of combinations of defoamers with a wetting agent or an emulsifier. The Blender Foam Test was employed using a Waring Blender method of agitation (30 seconds), and the foamed density was measured at t=0 min and at t=10 min. The results of this testing are shown below.

|  | Amount (g) |
|---|---|
| Grind | |
| Acrylic emulsion (Maincote HG-54) | 42.15 |
| Dispersant (Tamol 681) | 0.96 |
| Ammonium hydroxide | 0.11 |
| Grind Defoamer (Drewplus L-405) | 0.25 |
| Pigment (Ti-Pure R900 HG) | 13.45 |
| Rheology modifier (Acrysol RM825) | 0.05 |

Foam Benefits With a Wetting Agent or an Emulsifier

| Wetting Agent/ Emulsifier | Test Method | Parameter Measured | Ratio (W.A./Def. or Emul/Def)/ Total Conc. | Time (min) | TMDDD | HTMDDD | TMDD | HTMDD | Alcohol alkoxylate D | Blank (no defoamer) |
|---|---|---|---|---|---|---|---|---|---|---|
| DOSS | Waring Blender | Foamed Density (g/mL) | 1:1; 0.2% total actives | 0 | 0.91 | 0.89 | 0.79 | 0.79 | 0.69 | 0.77 |
| DOSS | Waring Blender | Foamed Density (g/mL) | 1:1; 0.2% total actives | 10 | 0.94 | 0.98 | 0.9 | 0.91 | 0.72 | 0.85 |
| DOSS | Waring Blender | Foamed Density (g/mL) | 1:1; 0.2% total actives | Time to no foam^ | 19.02 | 16.37 | NA* | NA | NA | NA |
| Primary alcohol ethoxylate | Waring Blender | Foamed Density (g/mL) | 2.5:1 Emul/Def; 0.7% total actives | 0 | 0.74 | 0.77 | 0.58 | 0.74 | 0.47 | 0.48 |
| Primary alcohol ethoxylate | Waring Blender | Foamed Density (g/mL) | 2.5:1 Emul/Def; 0.7% total actives | 10 | 0.88 | 0.88 | 0.84 | 0.79 | 0.55 | 0.52 |

*NA implies that foam was still present after 30 minutes
^The shorter the time to no foam, the better As shown in the table above, the defoaming performance of HTMDDD when combined with DOSS is better than that of all other products tested and than that of the blank. This advantage is shown through both the 10-minute data and via the time required to break the foam. The strong antifoaming performance of HTMDDD and TMDDD is clearly shown by the foam data at t=0 min. The antifoaming performance of the HTMDDD when combined with a primary alcohol ethoxylate (PAE) and the antifoaming performance of HTMDD and TMDDD, is clearly observed by the foam data at t=0 min. Neither the benchmark defoamer (alcohol alkoxylate D) nor the blank control foam performance even approaches that of the alkane diol foam controlling agents when combined with either DOSS or the PAE. Contrary to the behavior of the defoamer alone in water (example 6), the defoaming and antifoaming performance of both HTMDDD and the TMDDD is better than that of HTMDD and TMDD, with that of the HTMDD and TMDD being better than that of the blank and the alcohol alkoxylate D.

Example 2

Performance Benefits in an Industrial Maintenance Coating

To the following formulation was added the multifunctional foam controlling agent of the invention:

-continued

|  | Amount (g) |
|---|---|
| Letdown | |
| Acrylic emulsion (Maincote HG-54) | 33.56 |
| Plasticizer (Texanol) | 4.71 |
| Defoamer (Drewplus Y-250) | 0.37 |
| Wetting agent/defoamer (HTMDD) | 0.98 |
| Ammonium hydroxide | 0.42 |
| Sodium nitrite | 0.86 |
| Water | 2.08 |
| Rheology modifier (Acrysol RM825) | 0.05 |
| Total | 100.00 |

The grind portion of the formulation refers to the grinding of a dry pigment in the presence of a dispersant such that pigment aggregates are broken down to primary particles via shear and are dispersed via steric and/or electrostatic stabilization. The defoamer that has been added in the grind is present to control the foam that is generated in the high shear grinding operation. The grind is then let-down (or diluted) through the addition of the grind to a mixture of the binder (emulsion) and solvents in an attempt to evenly add color to the coating. The defoamer that is used in the let-down step is added to provide some foam control and the wetting agent/defoamer (HTMDD) is added to enhance the wetting, flow and leveling, foam performance, and general appearance of the final dried coating. The use of the alkane diol in the let-down portion of the formulation is not intended to limit its use to that step of the formulation preparation.

Foam, Adhesion, and Appearance Comparisons in an Industrial Maintenance Coating

| Benefit | Test Method | Parameter Measured* | TMDD | HTMDD | Silicone A | Alkyl Phenol Ethoxylate | Blank Value (no additive) |
|---|---|---|---|---|---|---|---|
| Pinholes (U) | Visual | 0–5 scale | 0 | 3 | 0 | 0 | 1 |
| Craters (U) | Visual | 0–5 scale | 4 | 4 | 1 | 0 | 0 |
| 20 deg Gloss (U) | Glossmeter | ~0–50 scale | 19 | 30 | 26 | 22 | 28 |
| 60 deg Gloss (U) | Glossmeter | ~0–90 scale | 56 | 71 | 66 | 61 | 68 |
| Pinholes (C) | Visual | 0–5 scale | 0 | 3 | 1 | 0 | 1 |
| Craters (C) | Visual | 0–5 scale | 4 | 4 | 2.5 | 0 | 0 |
| Adhesion (C) | Cross-hatch (ASTM# D3359-95B) | 0–5 scale | 5 | 3 | 2 | 2 | 0 |
| 20 deg Gloss (C) | Glossmeter | 0–50 scale | 29 | 31 | 21 | 22 | 21 |
| 60 deg Gloss (C) | Glossmeter | 0–90 scale | 68 | 71 | 58 | 58 | 58 |
| Foam | Red Devil Shaker | Foamed Density (g/mL) | 0.78 | 0.80 | 0.67 | 0.76 | 0.84 |

*In all cases, the higher the value, the better the performance
^U refers to an uncontaminated substrate and C refers to an engine oil-contaminated substrate As shown above, HTMDD provides better foam control than all of the other additives, with all additives contributing some level of foam to the formulation. The alkane diol HTMDD also shows superior performance for pinholes (U and C) and 20 and 60 degree gloss (U and C) relative to all of the other additives and to the blank control. Better adhesion is observed for HTMDD relative to the blank control and to most of the other additives.

Example 3

Performance Benefits in a Wood Coating

To the following formulation was added the multifunctional foam controlling agent of the invention:

|  | Amount (g) |
|---|---|
| Acrylic Emulsion (Neocryl XK-12) | 77.7 |
| Deionized Water | 10.8 |
| Ammonium Hydroxide, 25% | 5 drops |
| Solvent (Butyl glycol) | 4.7 |
| Coalescent Additive (Lusolvan FBH) | 0.5 |
| Wax additive (Aquacer 513) | 3.8 |
| Thickener (Coatex BR-100-P, 1:1 with water) | 0.5 |
| Matting Agent (Deuteron MK) | 1.0 |
| Defoamer (HTMDD) | 1.0 |

Foam, Wetting, and Appearance Comparisons in a Wood Coating

| Benefit | Test Method | Parameter Measured | conc. (wt %) | TMDD | HTMDD | Alcohol alkoxylate A | Alcohol alkoxylate B | Silicone B | Silicone C | Blank (no additive) |
|---|---|---|---|---|---|---|---|---|---|---|
|  |  |  |  |  |  | (dynes/cm) |  |  |  |  |
| Foam control (after 1 min) | Dispermat | Density (g/ml) | 0.25 / 1.5 | 0.96 / 0.97 | 1.00 / 0.98 | 0.87 / 0.84 | 0.94 / 0.92 | 0.95 / 0.86 | 0.87 / 0.88 | 0.87 |
| Foam control (after 4 min) | Dispermat | Density (g/ml) | 0.25 / 1.5 | 0.96 / 0.97 | 1.00 / 0.99 | 0.87 / 0.83 | 0.95 / 0.92 | 0.87 / 0.85 | 0.87 / 0.88 | 0.87 |
| Wetting | Surface Tension-Bubble Tensiometer | Surface Tension* (20 b/s) | 0.25 / 1.5 | 50 / 41 | 51 / 43 | 58 / 47 | 58 / 43 | 53 / 54 | 51 / 54 | 53 |

*The lower the surface tension, the better the wetting performance

As observed from the data above, the HTMDD exhibits improved foam performance in the formulation above relative to other additives and to the blank control. The wetting performance of HTMDD is considerably better (lower) than that of the blank and better than or equal to that of most of the other additives. Additional benefits were observed relative to the blank control and some of the additives in the areas of leveling and pinholes.

Example 4

Performance Benefits in an Automotive Primer Coating

To the following formulation was added the multifunctional foam controlling agent of the invention:

|  | Amount (g) |
|---|---|
| Polyester Resin (Bayhydrol D270) | 18.49 |
| Deionized Water | 33.86 |
| Modified PU Resin (Bayhydrol FT 145) | 14.70 |
| Dimethylethanolamine (100%) | 0.35 |
| Grind Aid (Additol XW 395) | 0.49 |
| Carbon Black Pigment (Specialschwarz 4) | 0.03 |
| TiO2 Pigment (Tronox R-FD-I) | 10.23 |
| Filler (Blanc Fixe Micro) | 13.62 |
| Filler (Talkum IT Extra) | 3.93 |
| Melamine-Formaldehyde Resin | 3.30 |
| Defoamer (HTMDD) | 1.00 |

TMDD, and most of the other additives. This data also demonstrates the improved (lower) surface tension of samples containing HTMDD relative to the control and most other additives. The added benefits of fewer pinholes and good leveling make HTMDD the top-performing additive relative to overall performance, with a particular emphasis on foam control.

Example 5

Performance Benefits in a Packaging Ink

To the following formulation was added a multifunctional foam controlling agent of the invention:

|  | Amount (g) |
|---|---|
| Acrylic emulsion (Joncryl 624) | 45.0 |
| Pigment dispersion (Flexiverse BFD-1121) | 45.0 |
| Wax emulsion (Jonwax 26) | 5.0 |
| Water | 4.0 |
| Defoamer (HTMDD) | 1.0 |

Foam and Appearance Comparisons in an Automotive Primer Coating

| Benefit | Test Method | Parameter Measured | Conc. (wt %) | TMDD | HTMDD | Alcohol alkoxylate C | Silicone D | Silicone E | Blank (no additive) |
|---|---|---|---|---|---|---|---|---|---|
| Foam control (1 min) | Dispermat | Density (g/ml) | 0.25 | 1.09 | 1.29 | 1.10 | 1.21 | 1.28 | 0.99 |
|  |  |  | 0.5 | 1.15 | 1.19 | 1.04 | 1.06 | 1.18 |  |
| Foam control (4 min) | Dispermat | Density (g/ml) | 0.25 | 1.10 | 1.30 | 1.10 | 1.21 | 1.29 | 0.99 |
|  |  |  | 0.5 | 1.15 | 1.19 | 1.04 | 1.06 | 1.18 |  |
| Wetting | Surface Tension- Bubble Tensiometer | Surface Tension at 20 b/s (dynes/cm) | 0.25 | 49.66 | 50.76 | 54.62 | 58.49 | 54.48 | 58.28 |
|  |  |  | 0.5 | 45.33 | 47.50 | 54.38 | 56.99 | 54.48 |  |
| Aesthetics | Observation | Pinholes | 0.25 | 4 | 5 | 4 | 4 | 3 | 3 |
|  |  |  | 0.5 | 5 | 4 | 4 | 3 | 3 |  |
| Aesthetics | Observation | Levelling | 0.25 | 3 | 4 | 3 | 2 | 4 | 3 |
|  |  |  | 0.5 | 4 | 4 | 4 | 4 | 4 |  |

As shown by the data above, the foam control performance of HTMDD is superior to that of the blank control,

Foam Control, Wetting and Polymer Compatibility Comparisons in a Packaging Ink

| Benefit | Test Method | Parameter Measured | conc. (wt %)* | S104PA | HTMDD | Alcohol alkoxylate | 5% IPA | DOSS | Blank (no additive) |
|---|---|---|---|---|---|---|---|---|---|
| Wetting/ Printability | Hand Proof | 1–10 scale | 1.0 | 8 | 9 | 8 | 6 | 8 | 5 |
| Foam | Waring Blender | Foamed Density (g/mL) | 1.0 | 0.64 | 0.68 | 0.56 | 0.52 | 0.50 | 0.47 |

-continued

Foam Control, Wetting and Polymer Compatibility Comparisons in a Packaging Ink

| Benefit | Test Method | Parameter Measured | conc. (wt %)* | S104PA | HTMDD | Alcohol alkoxylate | 5% IPA | DOSS | Blank (no additive) |
|---|---|---|---|---|---|---|---|---|---|
| Polymer Degradation^ | wt % gained | wt % gained | 1.0 | 11.9 | 5.2 | 6 | 60.4 | 6.6 | NA |
| Gloss | Glossmeter | 60 deg gloss | 1.0 | 24.4 | 24.4 | 24.3 | 24 | 21.6 | 22.7 |

*All concentrations are 1% except for the IPA use at 5%
^The lower the amount of weight gain, the lesser the degree of polymer swelling As indicated in the data shown above, the HTMDD is not only superior in its foam control performance, but also in its positive influence on printability, low influence on plate swelling, and positive influence on gloss. It is by far the best performer for these attributes relative to the blank control as well as competitive products and Surfynol® 104PA (S104PA).

Example 6

HTMDD and HTMDDD Foam Performance in Water

The foam performance of 0.1wt % HTMDD and HTMDDD was compared with that of Surfynol® 104 and TMDDD, respectively, using the Ross-Miles foam test.

| Time (min.) | HTMDD | TMDD | HTMDDD | TMDDD |
|---|---|---|---|---|
| 0 | 0 cm | 0 cm | 1.7 cm | 0.5 cm |
| 5 | 0 cm | 0 cm | 0 cm | 0 cm |
| Time to no foam | 0 sec. | 0 sec. | 3 sec. | 2 sec. |

Example 7

Comparison With Prior Art Example

Similar foam testing to that of example 1 was carried out for combinations of the alkane alcohol and diols mentioned in the background art with a wetting or an emulsifying agent. Not only does the data below show that Surfynol® 61 (S61), DMOD (3,6-dimethyl-4-octyne-3,6-diol or Surfynol® 82), HDMOD (3,6-dimethyloctane-3,6-diol), and HDMHD (2,5-dimethyl-2,5-hexane diol or DH-S) do not defoam, but they actually add foam to DOSS and to the PAE used in this study. Since the prior art does not differentiate among the performance of tertiary alkane diols and monoalcohols, one might infer from the prior art that the foam performance of additives such as S61, DMOD, HDMOD, HDMHD, HTMDD, and HTMDDD would be identical. However, this data clearly shows the unexpected result of better antifoaming and defoaming performance of TMDDD and HTMDDD relative to S61, HDMOD, DMOD, and the blank control.

ML02143.APP

| Wetting Agent/ Emulsifier | Test Method | Parameter Measured | Ratio (W.A./Def. or Emul/Def)/ Total Conc. | Time (min.) | TMDDD | HTMDDD | S61 | DMOD | HDMOD | Blank (no additive) |
|---|---|---|---|---|---|---|---|---|---|---|
| DOSS | Waring Blender | Foamed Density (g/mL) | 1:1; 0.2% total actives | 0 | 0.91 | 0.89 | 0.59 | 0.65 | 0.65 | 0.77 |
| DOSS | Waring Blender | Foamed Density (g/mL) | 1:1; 0.2% total actives | 10 | 0.94 | 0.98 | 0.65 | 0.70 | 0.72 | 0.85 |
| Secondary alcohol ethoxylate | Waring Blender | Foamed Density (g/mL) | 2:1; 0.7% total actives | 0 | 0.74 | 0.77 | 0.43 | 0.42 | 0.42 | 0.48 |
| Secondary alcohol ethoxylate | Waring Blender | Foamed Density (g/mL) | 2:1; 0.7% total actives | 10 | 0.88 | 0.88 | 0.45 | 0.43 | 0.43 | 0.52 |

As reported above, the defoaming and antifoaming performance of Surfynol® 104 and HTMDD are identical and better than that of HTMDDD and TMDDD in water. The defoaming and antifoaming performance of the TMDDD versus the HTMDDD are different, with the HTMDDD showing greater initial foam height, or more foam, and requiring a longer time to break the foam generated in this test method.

We claim:

1. A method for controlling the foaming of a waterborne composition or an industrial process by the incorporation of a foam controlling agent which comprises utilizing as the foam controlling agent in an amount of 0.001% to 5% by weight, a compound of the formula:

$HOR_1R_3C-[CH_2]_n-CR_2R_4OH$ wherein $R_1$ and $R_2$ are independently selected from the group of alkyl radicals having from 3 to 6 carbon atoms, $R_3$ and $R_4$ are independently alkyl radicals having from 1 to 2 carbon atoms, and n is an integer from 1 to 6; the compound generating an initial (t=0 min.) or a final (t=10 min.) foamed density at least 30% greater than that of a 0.5 wt % aqueous solution of a 12 mole ethoxylate of a $C_{12}$–$C_{15}$ primary alcohol ($C_{12}$–$C_{15}E_{12}$) when added at 0.2 wt % to the $C_{12}$–$C_{15}E_{12}$ solution.

2. The method of claim 1 in which $R_1$ and $R_2$ are independently selected from the group of alkyl radicals having from 4 to 6 carbon atoms.

3. The method of claim 1 in which $R_3$ and $R_4$ are methyl.

4. The method of claim 1 in which n is from 1 to 4.

5. The method of claim 1 in which n is 2.

6. The method of claim 1 in which $R_1$ and $R_2$ are independently selected from the group of alkyl radicals having from 4 to 6 carbon atoms, $R_3$ and $R_4$ are methyl, and n is 2.

7. The method of claim 1 in which the compound is 2,4,7,9-tetramethyldecane-4,7-diol.

8. The method of claim 1 in which the compound is 2,5,8,11-tetramethyldodecane- 5,8-diol.

9. The method of claim 1 in which the compound generates an initial (t=0 min.) or a final (t=10 min.) foamed density at least 40% greater than that of a 0.5 wt % aqueous solution of a 12 mole ethoxylate of a $C_{12}$–$C_{15}$ primary alcohol ($C_{12}$–$C_{15}E_{12}$) when added at 0.2 wt % to the $C_{12}$–$C_{15}E_{12}$ solution.

10. The method of claim 1 in which the compound generates an initial (t=0 min.) or a final (t=10 min.) foamed density at least 50% greater than that of a 0.5 wt % aqueous solution of a 12 mole ethoxylate of a $C_{12}$–$C_{15}$, primary alcohol ($C_{12}$–$C_{15}E_{12}$) when added at 0.2 wt % to the $C_{12}$–$C_{15}E_{12}$ solution.

11. The method of claim 1 in which the compound generates an initial (t=0 min.) and a final (t=10 min.) foamed density at least 30% greater than that of a 0.5 wt % aqueous solution of a 12 mole ethoxylate of a $C_{12}$–$C_{15}$ primary alcohol ($C_{12}$–$C_{15}E_{12}$) when added at 0.2 wt % to the $C_{12}$–$C_{15}E_{12}$ solution.

12. The method of claim 1 in which the waterborne composition is a protective or decorative coating; an ink composition; an adhesive composition; an overprint varnish; a radiation cured coating, ink, overprint varnish, adhesive composition; or an agricultural composition.

13. The method of claim 1 in which the industrial process is oil well pumping, petroleum gas scrubbing, cleansing, disinfecting, food processing, pulp processing, paper processing, fermentation, metal treatment, polymer synthesis, chemical synthesis, waste-water treatment, textile dyeing or textile finishing.

14. The method of claim 1 in which the foam controlling agent compound provides at least one other performance benefit.

15. An aqueous composition comprising in an aqueous medium a foam controlling agent, which composition manifests greater foaming in the absence of the foam controlling agent, wherein the foam controlling agent is an alkane diol compound present in an amount from 0.001% to 5% by weight and has the formula:

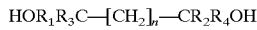

wherein $R_1$ and $R_2$ are independently selected from the group of alkyl radicals having from 3 to 6 carbon atoms, $R_3$ and $R_4$ are independently alkyl radicals having from 1 to 2 carbon atoms, and n is an integer from 1 to 6; the alkane diol compound generating an initial (t=0 min.) or a final (t=10 min-) foamed density at least 30% greater than that of a 0.5wt % aqueous solution of a 12 mole ethoxylate of a $C_{12}$–$C_{15}$ primary alcohol ($C_{12}$–$C_{15}E_{12}$) when added at 0.2 wt % to the $C_{12}$–$C_{15}E_{12}$ solution.

16. The composition of claim 15 in which $R_1$ and $R_2$ are independently selected from the group of alkyl radicals having from 4 to 6 carbon atoms.

17. The composition of claim 15 in which $R_3$ and $R_4$ are methyl.

18. The composition of claim 15 in which n is from 1 to 4.

19. The composition of claim 15 in which n is 2.

20. The composition of claim 15 in which $R_1$ and $R_2$ are independently selected from the group of alkyl radicals having from 4 to 6 carbon atoms, $R_3$ and $R_4$ are methyl, and n is 2.

21. The composition of claim 15 in which the compound is 2,4,7,9-tetramethyldecane-4,7-diol.

22. The composition of claim 15 in which the compound is 2,5,8,11-tetramethyldodecane-5,8-diol.

23. The composition of claim 15 in which the compound generates an initial (t=0 min.) or a final (t=10 min.) foamed density at least 40% greater than that of a 0.5wt % aqueous solution of a 12 mole ethoxylate of a $C_{12}$–$C_{15}$ primary alcohol ($C_{12}$–$C_{15}E_{12}$) when added at 0.2 wt % to the $C_{12}$–$C_{15}E_{12}$ solution.

24. The composition of claim 15 in which the compound generates an initial (t=0 min.) or a final (t=10 min.) foamed density at least 50% greater than that of a 0.5 wt % aqueous solution of a 12 mole ethoxylate of a $C_{12}$–$C_{15}$ primary alcohol ($C_{12}$–$C_{15}E_{12}$) when added at 0.2 wt % to the $C_{12}$–$C_{15}E_{12}$ solution.

25. The composition of claim 15 in which the compound generates an initial (t=0 min.) and a final (t=10 min.) foamed density at least 30% greater than that of 0.5 wt % aqueous solution of a 12 mole ethoxylate of a $C_{12}$–$C_{15}$ primary alcohol ($C_{12}$–$C_{15}E_{12}$) when added at 0.2 wt % to the $C_{12}$–$C_{15}E_{12}$ solution.

26. The composition of claim 15 which comprises in water an inorganic compound which is a mineral ore, an inorganic compound which is a pigments, an organic compound which is a pigment, a polymerizable monomer, an emulsion, an oligomeric resin, a polymeric resin, a detergent, a herbicide, an insecticide, a fungicide, or a plant growth modifying agent.

27. The composition of claim 15 which is an aqueous ink composition comprising in an aqueous medium 20 to 60 wt % of an ink composition which comprises the following components:

(a) 1 to 50 wt % of a pigment;

(b) 0 to 50 wt % of a pigment dispersant, grind resin or mixtures thereof;

(c) 0 to 50 wt % of a clay base in a resin solution vehicle;

(d) 5 to 99 wt % of a water-borne, water-dispersible, water-soluble resin;

(e) 0 to 30 wt % of a coalescing or other solvent;

(f) 0.01 to 10 wt % of a processing aid, solubilizing agent, or mixtures thereof;

(g) 0.01 to 10 wt % of a surfactant, wetting agent, provided that the wetting agent is not an alkane diol, or mixtures thereof; and (h) 0.001 to 5 wt % of the alkane diol foam controlling agent.

28. The composition of claim 15 which is an aqueous agricultural composition comprising in an aqueous medium 0.2 to 80 wt % of an agricultural composition which comprises the following components
  (a) 0.1 to 50 wt % of a herbicide, insecticide, plant growth modifying agent, or mixtures thereof;
  (b) 0 to 5 wt % of a dye;
  (c) 0 to 20 wt % of a thickener, stabilizer, co-surfactant, gel inhibitor, or mixtures thereof;
  (d) 0 to 25 wt % of an antifreeze;
  (e) 0.01 to 50 wt % of a surfactant, wetting agent, provided that the wetting agent is not an alkane diol, or mixtures thereof; and
  (f) 0.001 to 5wt % of the alkane diol foam controlling agent.

29. The composition of claim 15 which is a fountain solution composition comprising the following component:
  (a) 0.05 to 10 wt % of a film formable, water soluble macromolecule;
  (b) 1 to 25 wt % of an alcohol, glycol, or $C_2$–$C_{12}$ polyol;
  (c) 0.01 to 20 wt % of a water soluble organic acid, inorganic acid, or a salt thereof;
  (d) 30 to 70 wt % of water;
  (e) 0.01 to 5 wt % of a wetting agent, provided that the wetting agent is not an alkane diol; and
  (g) 0.001 to 5 wt % of the alkane diol foam controlling agent.

30. The composition of claim 15 which is a metalworking composition comprising the following components:
  (a) 2.5 to 10 wt % of a block copolymer;
  (b) 10 to 25 wt % of an alkanolamine;
  (c) 2 to 10 wt % of an organic monoacid;
  (d) 1 to 5 wt % of an organic diacid;
  (e) 50 to 60 wt % of wafer;
  (f) 1 to 5 wt % of a biocide; and
  (g) 0.001 to 5 wt % of the alkane diol foam controlling agent.

31. The composition of claim 15 which is a hard surface cleaning composition comprising the following components:
  (a) 1 to 5 wt % of an anionic surfactant;
  (b) 1 to 5 wt % of a nonionic surfactant;
  (c) 0.1 to 3 wt % of a carboxylate salt;
  (d) 1 to 5 wt % of a glycol ether:
  (e) 0.5 to 3 wt % of a buffering agent;
  (f) 80 to 95 wt % of water; and
  (g) 0.001 to 5 wt % of the alkane diol foam controlling agent.

32. The composition of claim 15 which is a photoresist developer composition comprising the following components:
  (a) 0.1 to 3 wt % of tetramethylammonium hydroxide;
  (b) 0 to 4 wt % of a phenolic resin;
  (c) 88 to 99.99 wt % of water; and
  (d) 10 to 50000 ppm of the alkane diol foam controlling agent.

33. The composition of claim 15 which is an overprint varnish composition comprising the following components
  (a) 20 to 80 wt % of a waterborne or water-dispersible resin;
  (b) 0 to 2 wt % of a wax;
  (c) 2 to 50 wt % of water;
  (d) 0 to 20 wt % of a biocide, optical brightener, cross-linker, or scuff and water-resistance additive;
  (e) 0 to 20 wt % of a co-solvent;
  (f) 0.01 to 5 wt % of a wetting agent, provided that the wetting agent is not an alkane diol; and
  (g) 0.001 to 5 wt % of the alkane diol foam controlling agent.

34. The composition of claim 15 in which the foam controlling agent compound provides at least one other performance benefit.

35. An aqueous coating composition comprising 30 to 80 wt % of the following components in an aqueous medium:
  (a) 0 to 50 wt % of a pigment dispersant, grind resin, or mixtures thereof;
  (b) 0 to 80 wt % of a coloring pigment, extender pigment, anti-corrosive pigment, other pigment types, or mixtures thereof;
  (c) 5 to 99 wt % of waterborne, water-dispersible. or water soluble resins, emulsions, or mixtures thereof;
  (d) 0 to 30 wt % of a slip additive, antimicrobial, processing aid, or mixtures thereof;
  (e) 0 to 60 wt % of coalescing, or other solvents;
  (f) 0.01 to 10 wt % of a surfactant agent, wetting agent, flow and leveling agent or mixtures thereof, provided that the wetting agent is not an alkane diol; and
  (g) 0.001 to 5 wt % of an alkane diol foam controlling agent, the alkane diol having the formula:

$$HOR_1R_3C\text{—}[CH_2]_n\text{—}CR_2R_4OH$$

wherein $R_1$ and $R_2$ are independently selected from the group of alkyl radicals having from 3 to 6 carbon atoms, $R_3$ and $R_4$ are independently alkyl radicals having from 1 to 2 carbon atoms, and n is an integer from 1 to 6; the alkane diol generating an initial (t=0 min.) or a final (t=10 min.) foamed density at least 30% greater than that of a 0.5 wt % aqueous solution of a 12 mole ethoxylate of a $C_{12}$–$C_{15}$ primary alcohol ($C_{12}$–$C_{15}E_{12}$) when added at 0.2 wt % to the $C_{12}$–$C_{15}E_{12}$ solution, wherein the aqueous coating composition manifests greater foaming in the absence of the foam controlling agent.

* * * * *